Aug. 26, 1952   L. O. BURT   2,608,401
CONTROL MEANS FOR VEHICLE AXLES
Filed Jan. 15, 1949   2 SHEETS—SHEET 1
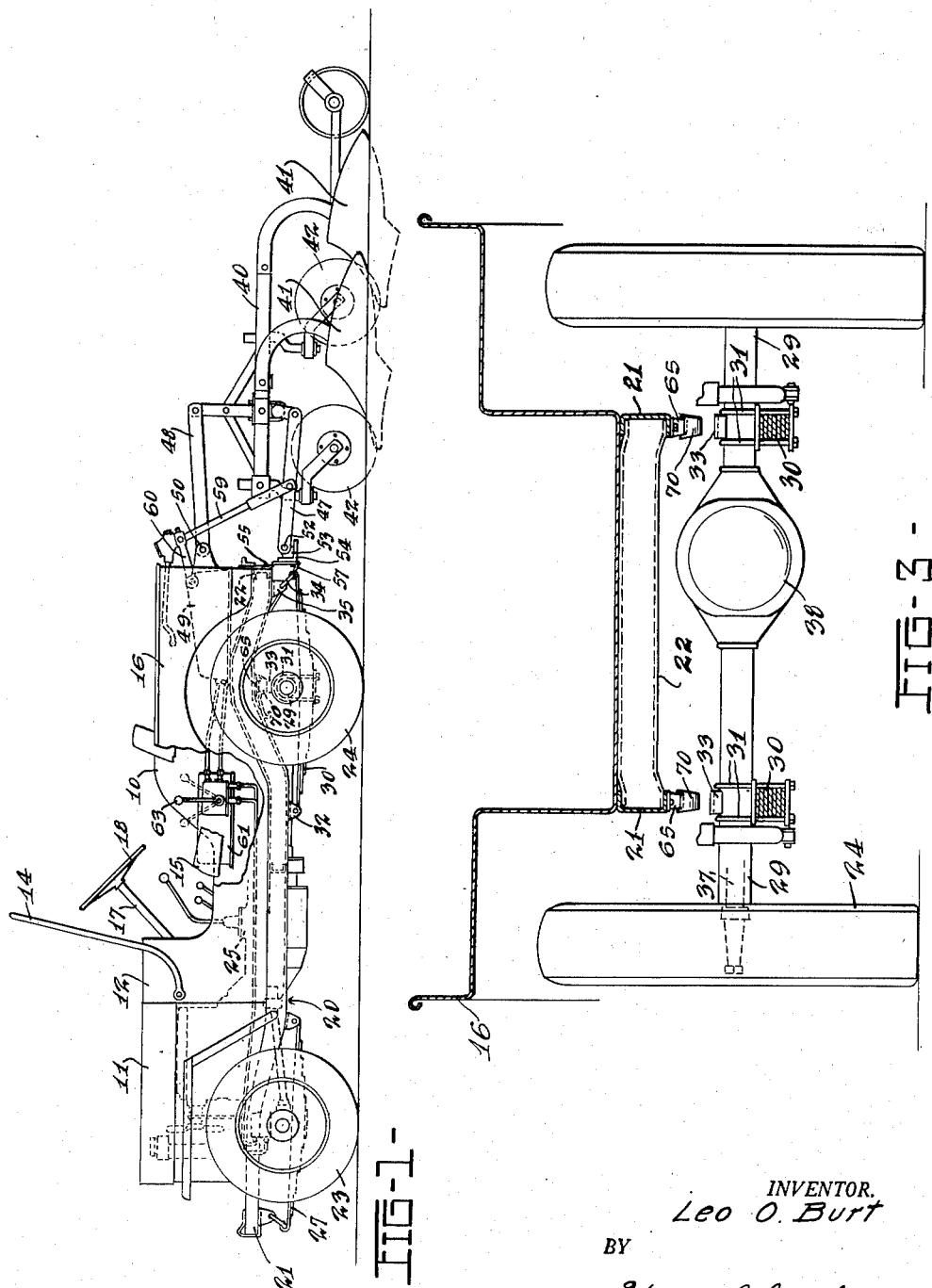
INVENTOR.
Leo O. Burt
BY
Harry O. Ernsberger
ATTY.

Aug. 26, 1952            L. O. BURT            2,608,401
CONTROL MEANS FOR VEHICLE AXLES
Filed Jan. 15, 1949                              2 SHEETS—SHEET 2
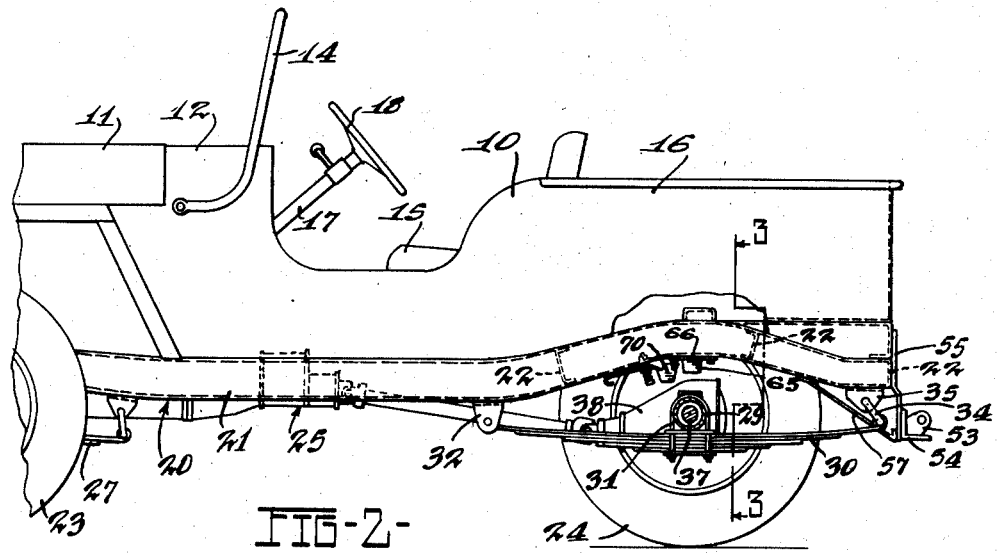
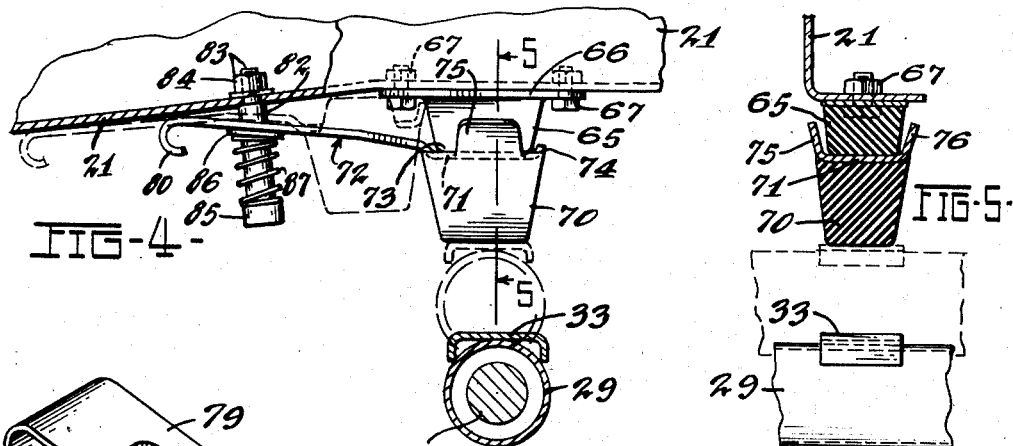
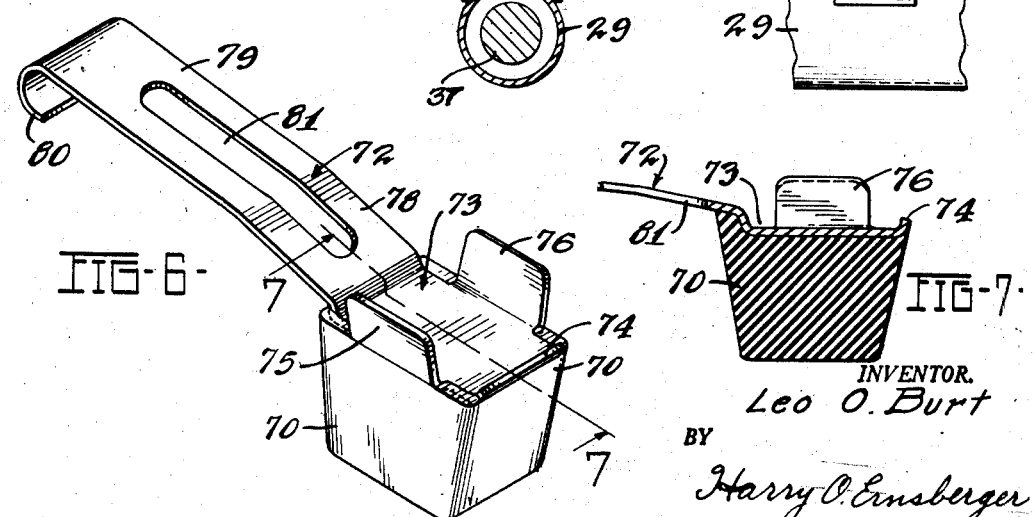
INVENTOR.
Leo O. Burt
BY
Harry O. Ernsberger
ATTY Patented Aug. 26, 1952

2,608,401

UNITED STATES PATENT OFFICE 2,608,401

CONTROL MEANS FOR VEHICLE AXLES

Leo O. Burt, Dearborn, Mich., assignor to Willys-Overland Motors, Inc., Toledo, Ohio, a corporation of Delaware Application January 15, 1949, Serial No. 71,058

6 Claims. (Cl. 267—30)

This invention relates to vehicles and more especially to an arrangement for limiting or controlling the relative vertical movement between an axle and the frame of a vehicle in which the axles are connected to the frame by means of springs.

Vehicles having frames supported upon springs and particularly of the four wheel drive type are being utilized as prime movers for powering soil moving or cultivating implements such as scrapers, plows, cultivators, harrows and the like through attachment of the implement direct to the vehicle or to an implement control or lifting device mounted upon the vehicle. In the operation of such a vehicle when utilized for scraping, plowing, cultivating, etc., the vehicle springs are subjected to wide variations in load due to the irregularity in terrain or in the varying characteristics of the soil or earth being moved or cultivated or caused by obstructions encountered by the implement so that relative vertical movement of the frame varies within comparatively wide limits. This excessive movement of the vehicle frame with respect to the axle or ground wheels results in the implement being drawn by the vehicle to move in a vertically undulating path. Such action causes the implement to move at different depths through the soil which is undesirable particularly in plowing a field where it is essential that the depth of the plowing be held substantially uniform.

The present types of four wheel drive vehicles are versatile in their application in that they may be used for earth or soil moving or cultivating purposes as above mentioned or used for rapid transportation on paved roadways. In the latter use it is desirable that their riding characteristics as far as comfort is concerned should be comparable to a conventional passenger vehicle and in such use the spring arrangement for connecting the axles with the frame should be capable of the usual substantially free vertical movement to secure desirable riding characteristics. In utilizing such a vehicle for plowing, cultivating or other soil moving operations, the usual vertical clearance for movement of the vehicle rear axle with respect to the frame has resulted in certain instances in the disadvantage of nonuniformity of plowing or cultivating depth in the soil.

The present invention embraces a means for limiting the relative vertical movement of an axle with respect to the frame in a sprung vehicle when the same is used with earth moving or soil cultivating implements.

Another object of the invention resides in the provision of an adjustable or retractable means which may be readily moved into the locus of vertical movement of the axle with respect to the frame for restricting relative movement of the frame with respect to the axle during soil moving or plowing operations and which may be withdrawn to an out-of-use position when the vehicle is used for transportation purposes and the like.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is an elevational view of a vehicle showing a soil working implement attached thereto;

Figure 2 is an elevational view showing a portion of the vehicle with the arrangement of my invention in an out-of-use position;

Figure 3 is a transverse sectional view taken substantially on the line 3—3 of Figure 2 showing the arrangement of my invention in a position of use;

Figure 4 is an enlarged detail view of the arrangement of my invention certain parts of the vehicle frame being shown in section;

Figure 5 is a detail vertical sectional view taken substantially on the line 5—5 of Figure 4;

Figure 6 is an isometric view illustrating the means for limiting a relative vertical movement of the vehicle frame with respect to an axle; and Figure 7 is a detail sectional view taken on the line 7—7 of Figure 6.

While I have illustrated the arrangement of my invention as embodied in a vehicle of the four wheel drive type especially adaptable for carrying on agricultural and soil moving operations, it is to be understood that the arrangement of my invention may be utilized with any type of vehicle wherein the vehicle frame is connected to an axle by spring means wherein it is desired under certain load conditions to limit the relative vertical movement of the frame and body with respect to an axle.

Referring to the drawings in detail I have illustrated an embodiment of my invention incorporated in a vehicle having four power driven wheels and adapted to be used per se as a road vehicle and which is readily adaptable for use as a prime mover for powering agricultural implements such as plows, harrows, cultivators and the like. The vehicle shown is inclusive of a body 10 having a hood portion 11 which encloses the engine or other power unit for propelling the vehicle. The forward portion of the body is provided with a cowl 12 upon which is mounted a windshield 14. The vehicle is provided with an operator's seat 15 to the rear of which is formed a truck or package compartment 16. The vehicle is provided with a steering post 17 and steering wheel 18. A suitable frame construction 20 supports the body and engine or power unit and is inclusive of longitudinally extending channel members 21 and transversely extending members 22 connecting members 21. The vehicle is supported upon front and rear drive wheels designated 23 and 24 respectively which are driven through the medium of propeller shafts connecting the axles with a transmission or gear set contained in a housing 25. The front axle is connected by means of leaf springs 27 to the frame 20 and the rear axle 29 is connected to leaf spring assemblies 30 by means of U-shaped members 31, the spring assemblies 30 being connected at their forward ends to the vehicle frame members 21 by means of brackets 32 while the rear ends of the spring assemblies 30 are connected by means of shackles 34 to brackets 35 secured to the vehicle frame. Disposed within the axles 29 are drive shafts 37 which are driven by suitable differential drive gear mechanism contained within a housing 38. Pads 33 are welded or otherwise secured to the axle 29 for a purpose to be hereinafter explained.

As particularly shown in Figure 1, the vehicle is illustrated in conjunction with earthworking implement or plow although it is to be understood that other types of soil moving or working instrumentalities may be connected to and adapted to be pulled or operated by the vehicle. In the drawings, a connecting means between the vehicle and the plow includes a hydraulic or other implement control or lifting mechanism. The plow illustrated in Figure 1 is of conventional design and includes a plow frame 40 carrying plow members 41 and coulter wheels 42. The plow frame 40 is connected to the lift mechanism by means of links 47 and 48. There are two of the links 47 and one link 48 which are connected to the plow at three spaced points. The central link 48 is connected to a housing 49 by means of a pin 50 the housing 49 enclosing a piston and cylinder arrangement (not shown) forming a power means or actuator for hydraulically raising and lowering the earthworking implement or plow. The links 47 are connected by means of pins 52 with brackets 53 carried by a transversely extending member 54 which is secured to depending members 55 connected to the transversely extending rear frame member 22. Angularly disposed struts 57 connect the member 55 with the frame to provide a strong and rigid structure for connecting the soil working implement to the vehicle.

The drawbar links 47 are connected by means of rods 59 with arms 60 which are journaled upon the housing 49 and are connected to the piston (not shown) of the lift mechanism contained within the housing 49. A reservoir 61 is mounted adjacent the vehicle operator's compartment and contains fluid for operating the implement lifting mechanism. A fluid pump (not shown) driven by the vehicle engine is connected with a reservoir 61 and the cylinder contained within housing 49 for directing fluid under pressure to the lift mechanism. The lift mechanism is controlled by means of a lever 63 mounted upon the reservoir 61 which actuates valve mechanism for controlling the flow of pressure fluid.

When the plow or implement is in operative or plowing engagement with the soil, forces or stresses are placed upon vehicle frame not only in tension but vertically acting forces which urge the frame downwardly flexing the spring assembly 30 thus bringing the rear axle 29 close to the vehicle frame 20. The resultant vertically acting force on the vehicle frame causes a flexing of the spring assemblies 30 until the resistance of the spring counterbalances the downwardly acting force. However, in soil working operations, the resistance acting on the implement moving through the soil is variable due to several forces, viz the condition of the soil as being dry or moist, the character of the soil, the working depth of the implement or the presence of obstructions in the soil which temporarily increase the stresses imparted to the vehicle.

The vehicle frame is normally provided with buffer or abutment blocks 65 preferably formed of rubber or other resilient material vulcanized to plates 66 which are secured by bolts 67 or other suitable means to the frame members 21. These buffer blocks 65 are disposed a vertical distance above the vehicle axle sufficient to permit extensive jounce of the axle to take care of road irregularities encountered in normal use of the vehicle on highways. When, however, the vehicle is utilized for operating earthworking implements, variable forces encountered in these operations result in a varying of the relative position of the frame of the vehicle with respect to the axle 29 which forces are usually insufficient to cause the axle 29 to engage the buffer blocks 65 to limit the relative movement between the axle and the frame but cause a vertical movement of the vehicle body which movement impairs the proper functioning of the soil working implement or plow. In order to overcome this difficulty I have provided means forming an abutment especially adapted for use during soil working operations providing a seat or stop to reduce the relative vertical movement of the frame with respect to the axle to provide for more uniform plowing and soil working operations as well as to minimize the shocks transmitted to the vehicle frame when the soil working implement encounters obstructions in the soil. To this end there is provided a pair of abutment members 70 which may be of hard rubber or other slightly resilient material which are vulcanized or otherwise secured to a uniplanar or pad portion 71 of an element 72. Each of the abutment members 70 is supported adjacent a block 65 so that when the abutment members 70 are brought into operative position as shown in Figure 4, each buffer block 65 will rest in a depression 73 formed by an upturned end 74 and two wings or side flanges 75 and 76. The side flanges 75 and 76 of element 72 are arranged to straddle a block 65 so as to prevent lateral displacement of the abutment member 70 with respect to the buffer block 65. Each element 72 is preferably bent intermediate its ends to present two angularly disposed portions 78 and 79, the portion 79 terminating in a hook-like configuration 80 providing a manipulating means for moving the element 72 to its operative and nonoperative positions. Each element 72 is formed with a longitudinal slot 81 to accommodate a pin or shaft 82 as shown in Figure 4. The pin 82 is provided with a reduced threaded portion 83 which extends through an opening in the frame member 21, the pin being secured to the frame by means of a nut 84. The pin is formed at its lower extremity with a head 85 and disposed between the head 85 and a washer 86 is an expansive coil spring 87. The spring 87 provides an upwardly acting force on element 72 to frictionally hold the latter in its operative and nonoperative positions.

The operation and functioning of this device is as follows: When the vehicle is being driven upon a roadway where substantially free spring action is desired, the abutment member 70 and its supporting means 72 is moved to an out-of-use position as shown in Figure 3 and in dotted lines in Figure 4. In this position the rubber block of abutment 65 provides for normal jounce or movement limiting means for the axle 29, the maximum relative vertical movement being restricted by engagement of the pads 33 with the abutment blocks 65. When the vehicle is used with an earthworking implement as shown in Figure 1, the operator moves the elements 72 in a right-hand direction as viewed in Figures 3 and 4 to the position shown in Figure 4. In this position the abutment blocks 70 are disposed beneath and in alignment with the abutment blocks 65 the compressive force of spring 87 serving to hold the elements 72 and blocks 70 in operative position. The members 72 are positioned with the abutment blocks 70 in alignment with blocks 65 so that the wall of each depression 73 contacts the lower surface of a block 65 in which position the lugs or flanges 75 and 76 prevent lateral shifting of the blocks 70 and the members or elements 72. As particularly shown in Figure 4, the maximum relative vertical movement of axle 29 is greatly limited, being determined by the engagement of the axle pads 33 with the blocks 70. In this manner variation in stress imparted to the implement when the same encounters obstructions in the earth during plowing or the like causes a minimum of vertical deflection or movement of the frame and body. This arrangement facilitates more uniform depth control of the earthworking implement. When it is desired to provide for maximum jounce or movement of the axle 29 relative to the vehicle frame, the operator moves or slides the elements 72 and blocks 70 in a left-hand direction as viewed in Figures 3 and 4 to an out-of-use position. While any number of these devices may be disposed above an axle, I have found that a pair of devices spaced so that an abutment is adjacent each end of the axle and in alignment with the longitudinally extending main frame members function satisfactorily.

It is apparent that, within the scope of the invention, modifications and different arrangements may be made other than is herein disclosed, and the present disclosure is illustrative merely, the invention comprehending all variations thereof.

What I claim is:

1. In a vehicle having a frame and axle construction wherein the axle is connected to the frame through spring; means for limiting the relative vertical movement between said axle and vehicle frame including an element movably supported upon the frame; an abutment block formed of yieldable material carried by said element; said element being movable to a position disposing the abutment block in registration with a locus of movement of the axle in vertical direction, and resilient by biased means for frictionally retaining said element in adjusted positions relative to said frame.

2. In combination with a vehicle having a frame and axle and spring means connecting the axle with the frame; means for limiting the relative vertical movement between the axle and frame including an abutment block formed of rubber; a supporting element for the abutment block; said element being movably supported upon said frame for disposing said abutment block in an operative and nonoperative position, and resilient means biasing said element into engagement with the frame for frictionally maintaining said element and abutment block in adjusted positions.

3. In combination with a vehicle having a frame and axle construction with spring means connecting the axle with the frame; means for limiting the relative vertical movement between the axle and frame including a resilient abutment block; a pin carried by the vehicle frame; a sheet metal bar supporting the abutment block; said bar being slidable relative to said frame for disposing said abutment block in an operative and nonoperative position, and a coil spring cooperating with the pin and said bar for frictionally securing the bar and abutment block in adjusted positions.

4. A device for limiting the relative vertical movement between a vehicle axle and frame including in combination an abutment block; an element connected to said abutment block; a pin carried by the vehicle frame and extending through a slot in said element; said abutment block being movable to a position to be engaged by said axle upon the relative vertical movement between said axle and frame and movable to an out-of-use position, and spring means cooperating with said pin and element to resiliently maintain said abutment block and element in adjusted positions.

5. In a device for limiting the relative vertical movement between a vehicle frame and axle including an abutment block, a sheet metal element supporting said abutment block; said sheet metal element being formed with a slot; a pin supported upon said frame and extending through said slot; means formed on said metal element for locating the abutment block in an operative position to be engaged by said axle upon relative vertical movement between said axle and vehicle frame, and a coil spring surrounding said pin for resiliently holding said element and abutment block in operative or nonoperative positions.

6. In a device for limiting the relative vertical movement between a vehicle frame and axle including a buffer block secured to the frame; an abutment block, a sheet metal element carrying said abutment block; said sheet metal element being formed with a slot; a pin supported upon said frame and extending through said slot; means formed on said metal element for positioning the abutment block in engagement with the buffer block and arranged to be engaged by said axle upon relative vertical movement between said axle and vehicle frame, and a coil spring surrounding said pin and in engagement with said element for resiliently holding said element and abutment block in operative or nonoperative positions.

LEO O. BURT.

REFERENCES CITED

The following references are of record in the file of this patent:

UNITED STATES PATENTS

| Number | Name | Date |
|---|---|---|
| 1,195,735 | Roberts | Aug. 22, 1916 |
| 2,209,632 | Martin | July 30, 1940 |

FOREIGN PATENTS

| Number | Country | Date |
|---|---|---|
| 291,837 | Great Britain | June 5, 1928 |